(12) United States Patent
Schmid et al.

(10) Patent No.: US 12,486,848 B2
(45) Date of Patent: Dec. 2, 2025

(54) DEVICE FOR CHANGING A PUMP UNIT OF A CENTRIFUGAL PUMP AND CENTRIFUGAL PUMP

(71) Applicant: Levitronix GmbH, Zürich (CH)

(72) Inventors: Alexander Schmid, Hotzenmattstrasse (CH); Samuel Schneider, Rietgrabenstrasse (CH); Natale Barletta, Baslerstrasse (CH)

(73) Assignee: Levitronix GmbH, Zürich (CH)

( * ) Notice: Subject to any disclaimer, the term of this patent is extended or adjusted under 35 U.S.C. 154(b) by 0 days.

(21) Appl. No.: 18/956,075

(22) Filed: Nov. 22, 2024

(65) Prior Publication Data

US 2025/0180039 A1    Jun. 5, 2025

(30) Foreign Application Priority Data

Dec. 5, 2023 (EP) .................................. 23214296

(51) Int. Cl.
| | |
|---|---|
| F04D 13/02 | (2006.01) |
| F04D 1/00 | (2006.01) |
| F04D 13/06 | (2006.01) |
| F04D 29/42 | (2006.01) |
| F04D 29/46 | (2006.01) |
| F04D 29/60 | (2006.01) |

(Continued)

(52) U.S. Cl.
CPC ............ *F04D 13/024* (2013.01); *F04D 1/00* (2013.01); *F04D 13/06* (2013.01); *F04D 13/0606* (2013.01); *F04D 29/426* (2013.01); *F04D 29/628* (2013.01); *F04D 13/022* (2013.01); *F04D 13/0613* (2013.01); *F04D 29/462* (2013.01); *F04D 29/601* (2013.01); *F04D 29/644* (2013.01); *F04D 29/648* (2013.01); *F05D 2260/52* (2013.01); *F05D 2260/57* (2013.01); *F05D 2270/65* (2013.01); *F05D 2270/66* (2013.01)

(58) Field of Classification Search
CPC combination set(s) only.
See application file for complete search history.

(56) References Cited

U.S. PATENT DOCUMENTS

| | | |
|---|---|---|
| 2,865,539 A | 12/1958 | Edwards |
| 5,045,026 A | 9/1991 | Buse |

(Continued)

FOREIGN PATENT DOCUMENTS

| | | |
|---|---|---|
| DE | 8624525 U1 | 7/1987 |
| GB | 2277786 A | 11/1994 |

OTHER PUBLICATIONS

European Search Report corresponding to European case dated May 3, 2024 with translation of category descriptions.

*Primary Examiner* — Binh Q Tran
(74) *Attorney, Agent, or Firm* — Global IP Counselors, LLP

(57) ABSTRACT

A device for changing a pump unit of a centrifugal pump is proposed. The centrifugal pump includes the pump unit and a stator extending in an axial direction. A cup-shaped recess is provided at the first axial end of the stator into which the pump unit is capable of being inserted. The device includes an actuating device with which a mechanical force is capable of being exerted on the pump unit. The mechanical force acts in the axial direction and is directed in such a way that it separates the pump unit from the stator in the axial direction.

15 Claims, 10 Drawing Sheets

(51) Int. Cl.
   *F04D 29/62*      (2006.01)
   *F04D 29/64*      (2006.01)

(56)         References Cited

U.S. PATENT DOCUMENTS

| | | | |
|---|---|---|---|
| 2014/0234141 | A1 | 8/2014 | Hoshi et al. |
| 2016/0102715 | A1 | 4/2016 | Nielsen et al. |
| 2016/0281712 | A1* | 9/2016 | Muizelaar ............... F04C 2/102 |
| 2016/0341203 | A1* | 11/2016 | Parsons ................ F04D 13/021 |
| 2018/0179923 | A1* | 6/2018 | Shepherd ................ F01M 1/02 |
| 2020/0362923 | A1* | 11/2020 | Rauh ...................... F16D 15/00 |
| 2021/0301801 | A1* | 9/2021 | Janecek ................. F04B 17/03 |
| 2021/0320578 | A1* | 10/2021 | Sheth .................... E21B 43/128 |
| 2023/0031535 | A1 | 2/2023 | Steinert et al. |
| 2023/0100781 | A1* | 3/2023 | Dalton ................... F04B 17/03 |
| | | | 417/415 |

\* cited by examiner

DEVICE FOR CHANGING A PUMP UNIT OF A CENTRIFUGAL PUMP AND CENTRIFUGAL PUMP

CROSS REFERENCE TO RELATED APPLICATIONS

This application claims priority to EP 23214296.8 filed Dec. 5, 2023, the entire contents of which are incorporated herein by reference.

BACKGROUND

Technical Field

The disclosure relates to a device for changing a pump unit of a centrifugal pump according to the preamble of the independent patent claim. The disclosure further relates to a centrifugal pump with such a device.

Background Information

Conventional centrifugal pumps can comprise a pump unit and a stator, wherein a rotor is provided in the pump unit, which forms the impeller of the centrifugal pump. The pump unit can be inserted into the stator and forms together with the stator an electromagnetic rotary drive. In the pump unit, the rotor can be magnetically supported without contact and can be driven without contact to rotate about an axial direction by means of the stator. Such centrifugal pumps are marketed, for example, by the applicant under the product name Levitronix® BPS pumps.

In these centrifugal pumps, a cup-shaped recess is provided in one of the axial ends of the stator into which the pump unit can be inserted, wherein the pump unit comprises a pump housing with a cup which can be inserted into the cup-shaped recess of the stator.

The stator and the rotor form an electromagnetic rotary drive, which is designed according to the principle of the bearingless motor. The term bearingless motor refers to an electromagnetic rotary drive in which the rotor can be supported completely magnetically with respect to the stator, wherein no separate magnetic bearings are provided. For this purpose, the stator is designed as a bearing and drive stator, which is both the stator of the electric drive and the stator of the magnetic bearing. A magnetic rotating field can be generated with the electrical windings of the stator, which on the one hand exerts a torque on the rotor, which effects its rotation about a desired axis of rotation defined by the axial direction and which, on the other hand, exerts an arbitrarily adjustable transverse force on the rotor so that its radial position can be actively controlled or regulated. Thus, three degrees of freedom of the rotor can be actively regulated, namely its rotation and its radial position (two degrees of freedom). With respect to three further degrees of freedom, namely its position in the axial direction and tilting with respect to the radial plane perpendicular to the desired axis of rotation (two degrees of freedom), the rotor is passively magnetically supported or stabilized by reluctance forces, i.e., it cannot be controlled. The absence of a separate magnetic bearing with a complete magnetic bearing of the rotor is the property, which gives the bearingless motor its name. In the bearing and drive stator, the bearing function cannot be separated from the drive function.

A particular advantage of such centrifugal pumps is the design of the rotor as an integral rotor, which is both the rotor of the electromagnetic rotary drive and thus the rotor of the electromagnetic drive and the magnetic bearing and also the rotor of the pump which conveys the fluid. This results in the advantage of a very compact and space-saving design.

Centrifugal pumps with non-contact magnetically supported and driven rotors, for example those which are designed according to the principle of the bearingless motor, have proven themselves in a large number of applications. Due to the absence of mechanical bearings, such centrifugal pumps are suitable for applications in which very sensitive substances are conveyed, for example blood pumps, or on which very high demands are made with respect to purity, for example in the semiconductor industry, the pharmaceutical industry, the biotechnological industry, or with which abrasive or aggressive substances are conveyed, which would very quickly destroy mechanical bearings, for example pumps for slurry, sulfuric acid, phosphoric acid or other chemicals in the semiconductor industry.

In the biotechnology industry or in the pharmaceutical industry, such centrifugal pumps are used, for example, in connection with bioreactors, e.g. for conveying the fluids into or out of the bioreactor. Particularly in such applications, sterility is very important in processes in which biological activities take place, for example. Sterilizing the devices, for example by means of steam sterilization, is very often a time-consuming and cost-intensive factor. For this reason, there is an increasing tendency today to design components of the respective device as single-use parts for such biotechnological processes in order to avoid time-consuming sterilization processes or to reduce them to a minimum. In particular, those components that come into direct contact with the biological substances during the process are often designed as single-use parts. The term single-use parts designates parts or components that may only be used once in accordance with their intended purpose. After use, the single-use parts are disposed of and replaced for the next application by new, i.e., not yet used, single-use parts.

Therefore, centrifugal pumps are known in which the pump unit is designed as a single-use part. After the respective application, the pump unit is separated from the stator and replaced by a new, not yet used pump unit.

SUMMARY

It has been determined that to achieve the highest possible efficiency, it is desirable that the pump unit can be exchanged in a very simple and quick manner and with as little effort as possible.

For this purpose, it is known, for example, to lock the pump unit in the cup-shaped recess of the stator by means of a bayonet lock. To change the pump unit, the bayonet lock is then opened, the pump unit is replaced with a new pump unit and the bayonet lock is locked again.

Even though this design has proven to be very successful in practice, there is a need for improvement, in particular for such centrifugal pumps which are designed for very high power, for example with an electric rotary drive designed for a power of more than 4 kW. Such centrifugal pumps often comprise very strong permanent magnets which are arranged in the rotor and/or stator. In such designs in particular, enormous magnetic forces act between the rotor and the stator. The passive magnetic forces, i.e., for example the reluctance forces, continue to act even when the windings of the stator are no longer applied with current. If the pump unit is then to be changed, these enormous magnetic forces between the rotor and the stator must be overcome.

Here, there is a very significant risk that the operating personnel will be injured when changing the pump unit or that components of the centrifugal pump will be damaged. The magnetic forces are often so great that it is hardly possible, or only with great effort, to separate the pump unit from the stator by hand.

Starting from this state of the art, it is therefore an object of the disclosure to propose a device for changing a pump unit of a centrifugal pump with a non-contact magnetically driven and levitated rotor, which enables a very simple, quick and safe separation of the pump unit from the stator. In addition, it is an object of the disclosure to propose a centrifugal pump with such a device for changing the pump unit.

The subject matter of the disclosure meeting this object is characterized by the features disclosed herein.

According to the disclosure, a device for changing a pump unit of a centrifugal pump is thus proposed, which centrifugal pump comprises the pump unit and a stator extending in an axial direction from a first axial end to a second axial end, wherein a cup-shaped recess is provided at the first axial end, into which the pump unit can be inserted, wherein the pump unit comprises a pump housing with a cup which can be inserted into the cup-shaped recess of the stator, wherein a rotor for conveying a fluid is arranged in the pump housing, which rotor has a magnetically effective core, wherein the rotor can be rotated about the axial direction, and wherein the stator is designed for a non-contact magnetic drive and a non-contact magnetic levitation of the rotor, wherein the rotor is passively magnetically stabilized with respect to the stator at least in axial direction. The device comprises an actuating device with which a mechanical force can be exerted on the pump unit, wherein the mechanical force acts in the axial direction and is directed in such a way that it separates the pump unit from the stator in axial direction.

With such a device, with which a mechanical force can be exerted on the pump unit in axial direction, the pump unit can be separated from the stator in a particularly simple manner and with very little manual effort by the operating personnel. This results in a significant reduction in the risk of injury for the operating personnel, and the pump unit is also reliably protected against damages. Furthermore, the device enables a particularly quick exchange of the pump unit, which is a great advantage particularly, but not only, for applications in biotechnology, for example, in which the pump unit is designed as a single-use part. This is because, particularly in such embodiments in which the pump unit is designed as a single-use part, it is a substantial aspect that the pump unit can be replaced or exchanged with as little time as possible.

However, even in applications in which the pump unit is designed for multiple use or for a reuse, the simple and quick separability of the pump unit from the stator is an advantage, for example if the pump unit or components of the pump unit need to be serviced, repaired or replaced. For example, it can be necessary to exchange the rotor, which forms the wheel or the impeller of the centrifugal pump.

Preferably, the device can be fixed to the stator or fixed relative to the stator.

Embodiments are possible in which the device for changing the pump unit is permanently attached to the stator, i.e. not only when the pump unit is intended to be changed. In other embodiments, the device is only fixed to the stator for the changing process. After the pump unit has been changed, the device is removed and separated from the stator. Embodiments are also possible in which the device can be fixed relative to the stator, for example by fixing the device and the stator on a common rail or the like.

According to a preferred embodiment, the actuating device is designed such that the mechanical force acts on the cup-shaped recess in the stator or on the cup of the pump housing. The actuating device then presses against the bottom of the cup or against the bottom of the cup-shaped recess, so that the pump unit alone or the pump unit together with the cup-shaped recess is pressed out of the stator in axial direction.

It is a preferred embodiment that the actuating device comprises a piston which can be displaced in axial direction, wherein the piston can be inserted into a centrally arranged opening in the stator, and the displacement of the piston relative to the stator generates the mechanical force which separates the pump unit from the stator in axial direction. The centrally arranged opening preferably extends from the second axial end of the stator in axial direction to the cup-shaped recess or to the cup of the pump unit. The piston is arranged in this centrally arranged opening, which piston can be displaced in axial direction relative to the stator. By displacing the piston, the pump unit alone or the pump unit together with the cup-shaped recess is then pressed out of the stator in axial direction. If the piston acts directly on the cup of the pump unit, the cup-shaped recess is provided with an opening through which the piston can pass.

The displacement of the piston in axial direction can be carried out, for example, by means of a threaded crank, which is operated manually, or by a motor, for example by means of a spindle motor.

It is a preferred measure that the device comprises a guide rail which can be fixed to the stator, wherein a supporting element displaceable in axial direction is arranged on the guide rail, which supporting element protects the pump unit against tilting when it is separated from the stator. The guide rail with the supporting element secure the pump unit against tilting with respect to the axial direction both when the pump unit is inserted into the stator and when the pump unit is separated from the stator and ensure that the pump unit cannot become twisted in the stator.

According to a further preferred embodiment, the actuating device is designed such that the mechanical force acts on an area of the pump housing which is arranged outside the cup-shaped recess of the stator. Thus, the force acting on the pump unit is applied here to an area of the pump unit which is not arranged in the cup-shaped recess of the stator when the pump unit is inserted into the stator.

Of course, such embodiments are also possible in which a force acting on the pump unit is applied both to the area of the pump unit that is arranged in the cup-shaped recess of the stator and to the area that is not arranged in the cup-shaped recess of the stator.

It is a further preferred measure that the actuating device comprises a spring element which can be inserted into a centrally arranged opening in the stator, wherein the spring element is designed such that it is tensioned in axial direction when the pump unit is inserted into the cup-shaped recess. As long as the pump unit is fixed in the stator, the spring element is under tension. If the pump unit is now to be separated from the stator, this tension on the spring element is used to support or cause the separation of the pump unit from the stator.

Thus, the spring element is designed and arranged in such a way that the spring element is tensioned when the pump unit is inserted, i.e. the pump unit is inserted into the stator against the force of the spring element. When the pump unit is inserted, the spring element has a damping effect, which has the advantage that the strong magnetic forces that try to pull the pump unit into the stator can be counteracted. In this way, the pump unit can be inserted gently and carefully into the stator. In particular, it can be reliably avoided that the pump unit hits the stator hard during insertion. When the pump unit is separated from the stator, the tensioned spring element exerts a force on the pump unit acting in axial direction, which supports or causes the separation from the stator.

According to a preferred embodiment, the device comprises a mounting device which can be fixed to the first axial end of the stator, wherein the mounting device has a ring-shaped base which is designed to embrace the pump housing, wherein several guide elements are arranged on the base in order to guide the pump housing in axial direction into the cup-shaped recess of the stator, wherein several attachment elements are provided for fixing the pump housing, and wherein the mounting device comprises several elastic elements which are tensioned in axial direction when the pump unit is fixed in the stator.

When the pump unit is inserted into the stator, the elastic elements, for example springs, are tensioned, i.e. the pump unit is inserted into the stator against the spring force of the elastic elements. When the pump unit is separated from the stator, the elastic elements cause the mechanical force, which acts in axial direction and tries to push the pump unit out of the stator.

In a further preferred embodiment, the device comprises a mounting ring which can be fixed to the first axial end of the stator such that it is arranged around the cup-shaped recess, wherein a first and a second guide rod are arranged on the mounting ring, which each extend in axial direction, wherein a pivotable holding device for holding the pump unit is provided at the first guide rod, which holding device can be pivoted into a holding position in which the holding device rests against the second guide rod, and wherein at least one tensioning lever is provided, by the actuation of which the holding device can be displaced in axial direction along the guide rods. In this embodiment, the mechanical force is generated with at least one tensioning lever, which can displace the pump unit in the axial direction along the guide rods.

Here, it is preferred that a locking element is provided at one of the guide rods, with which the holding device can be fixed to the guide rod when the pump housing is arranged in the cup-shaped recess. In doing so, an unintentional separation of the pump unit from the stator is avoided.

In a further preferred embodiment, the device comprises a bayonet ring which can be fixed to the first axial end of the stator such that it is arranged around the cup-shaped recess, wherein the bayonet ring is designed for a bayonet connection to the pump housing of the pump unit.

Preferably, the bayonet ring is designed in such a way that the pump housing can be fixed in the bayonet ring by a rotational movement relative to the bayonet ring about the axial direction, a subsequent movement in axial direction and a subsequent rotational movement about the axial direction.

A securing pin is preferably provided at the bayonet ring, with which the pump unit can be fixed in the bayonet ring when the pump housing is arranged in the cup-shaped recess. In doing so, an unintentional separation of the pump unit from the stator is avoided.

Furthermore, a centrifugal pump for conveying a fluid is proposed by the disclosure, with a pump unit and a stator extending in an axial direction from a first axial end to a second axial end, wherein a cup-shaped recess is provided at the first axial end, into which the pump unit can be inserted, wherein the pump unit comprises a pump housing with a cup which can be inserted into the cup-shaped recess of the stator, wherein a rotor for conveying the fluid is arranged in the pump housing, which rotor has a magnetically effective core, wherein the rotor together with the stator forms an electromagnetic rotary drive, wherein the stator is designed for a non-contact magnetic drive and a non-contact magnetic levitation of the rotor, and wherein the rotor is passively magnetically stabilized at least in axial direction. A device for changing the pump unit is provided, which is designed according to the disclosure.

According to a preferred embodiment, the device for changing the pump unit is designed such that it can be removed from the centrifugal pump in each case after the pump unit has been changed.

Of course, such embodiments are also possible in which the device for changing the pump unit is always fixed to the centrifugal pump, i.e. not only when the pump unit is changed.

In a particularly preferred embodiment of the centrifugal pump, the electromagnetic rotary drive is designed as a temple motor, wherein the stator has a plurality of coil cores, each of which comprising a longitudinal leg extending from a first end in axial direction to a second end, and a transverse leg which is arranged at the second end of the longitudinal leg, and which extends in a radial direction which is perpendicular to the axial direction, wherein the coil cores are arranged around the rotor with respect to the circumferential direction, so that the rotor is arranged between the transverse legs of the coil cores, and wherein at least one concentrated winding is provided on each longitudinal leg, which winding surrounds the respective longitudinal leg.

Further advantageous measures and embodiments of the disclosure are apparent from the dependent claims.

BRIEF DESCRIPTION OF THE DRAWINGS

In the following, the disclosure will be explained in more detail with reference to embodiments and with reference to the drawing. In the drawings.

DETAILED DESCRIPTION

A device for changing a pump unit of a centrifugal pump is proposed by the disclosure. For better understanding, an embodiment of a centrifugal pump for which the device according to the disclosure is suitable is first explained with reference to FIG. 1A, FIG. 1B and FIG. 2.

Figure 1A:
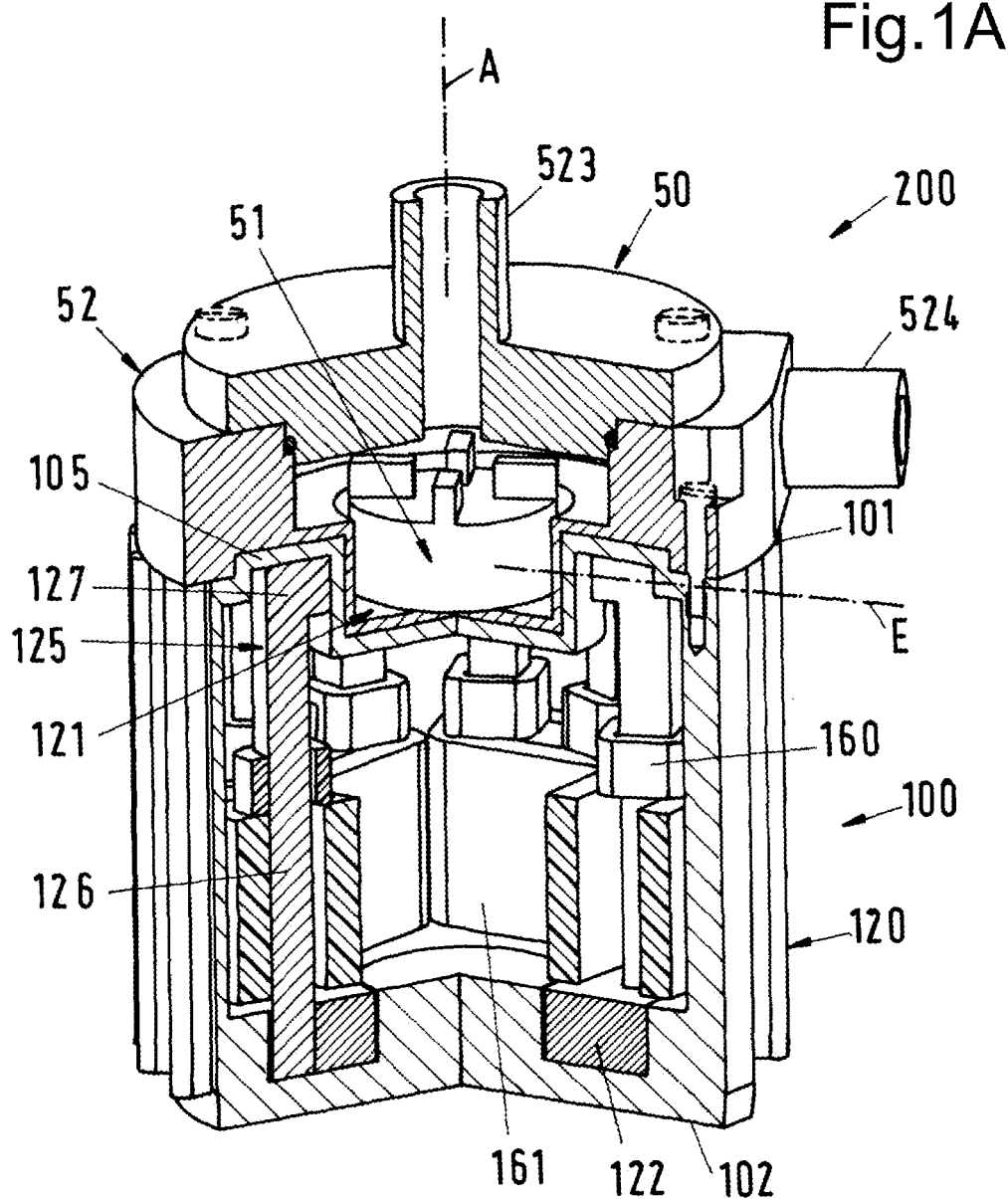
FIG. 1A is a perspective view of a centrifugal pump, partially in section.
Figure 1B:
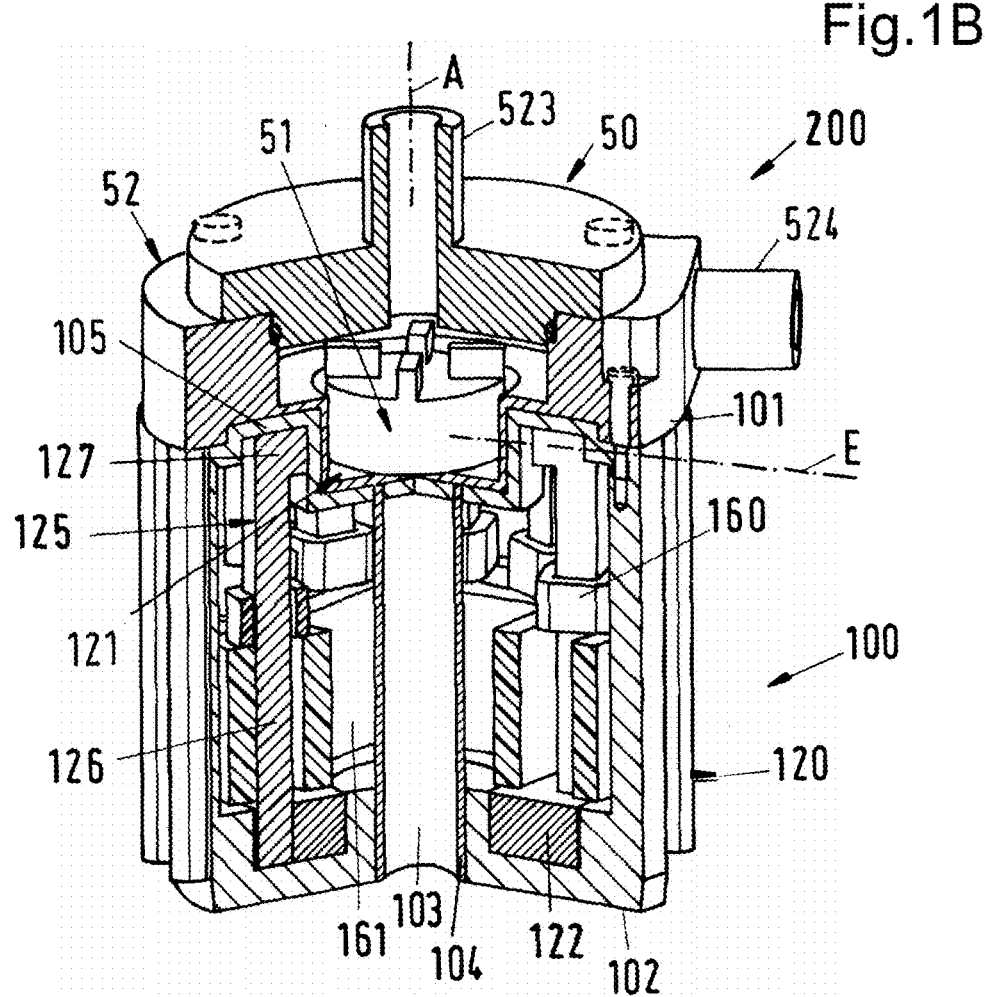
FIG. 1B is similar to FIG. 1A, but for a variant of the centrifugal pump.

FIG. 1A shows in a perspective view, partially in section, an embodiment of a centrifugal pump known per se, which is designated in its entirety by the reference sign 200. In an analogous representation to FIG. 1A, FIG. 1B shows a variant of the centrifugal pump 200. The centrifugal pump 200 comprises a pump unit 50 and a stator 100, which extends in an axial direction A from a first axial end 101 to a second axial end 102. The stator 100 further comprises a stator housing 120, which is preferably designed as a hermetically sealed stator housing 120 and encloses the other components of the stator 100 in a hermetically sealing manner. A cup-shaped recess 121 is provided at the first axial end 101 of the stator 100, into which the pump unit 50 can be inserted.

Figure 2:
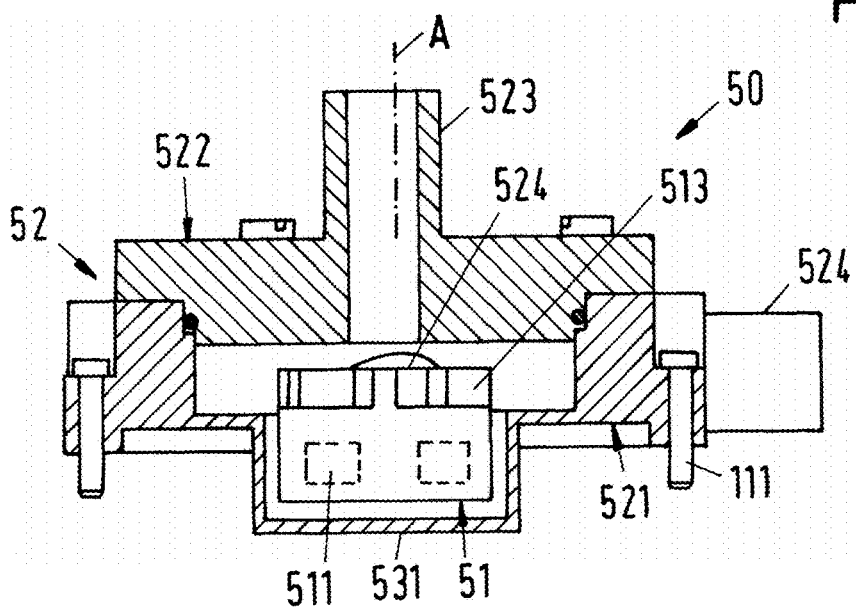
FIG. 2 is a sectional view of the pump unit of the centrifugal pump from FIG. 1A or FIG. 1B.

FIG. 2 shows a sectional view of the pump unit 50 of the centrifugal pump 200 from FIG. 1A or FIG. 1B. A rotor 51 is arranged in the pump unit 50, which forms the wheel or the impeller with which the fluid is conveyed. When the pump unit 50 is inserted into the cup-shaped recess 121 of the stator 100, the stator 100 forms with the rotor 51 an electromagnetic rotary drive for rotating the rotor 51 about the axial direction A. The stator 100 is designed for contactless magnetic levitation of the rotor 51, preferably according to the principle of the bearingless motor. For this purpose, the stator 100 is designed as a bearing and drive stator, with which the rotor 51 can be magnetically driven without contact for rotation about the axial direction A and can be magnetically levitated without contact with respect to the stator 100, wherein the rotor 51 is passively magnetically stabilized with respect to the axial direction A and is actively magnetically levitated in a radial plane perpendicular to the axial direction A, which is indicated by the line E in FIG. 1A and FIG. 1B.

The term bearingless motor refers to an electromagnetic rotary drive in which the rotor 51 can be levitated completely magnetically with respect to the stator 100, wherein no separate magnetic bearings are provided. For this purpose, the stator 100 is designed as a bearing and drive stator, which is both the stator 100 of the electrical drive and the stator 100 of the magnetic levitation. A magnetic rotating field can be generated with the electrical windings of the stator 100, which on the one hand exerts a torque on the rotor 51, which effects its rotation about a desired axis of rotation defined by the axial direction A and which, on the other hand, exerts an arbitrarily adjustable transverse force on the rotor 51 so that its radial position in the radial plane E can be actively controlled or regulated. Thus, three degrees of freedom of the rotor 51 can be actively regulated, namely its rotation and its radial position (two degrees of freedom). With respect to three further degrees of freedom, namely its position in axial direction A and tilting with respect to the radial plane E perpendicular to the desired axis of rotation (two degrees of freedom), the rotor 51 is passively magnetically levitated or stabilized by reluctance forces, i.e., it cannot be controlled. The absence of a separate magnetic bearing with a complete magnetic levitation of the rotor 51 is the property, which gives the bearingless motor its name. In the bearing and drive stator 100, the bearing function cannot be separated from the drive function.

Preferably, the electromagnetic rotary drive with the stator 100 and the rotor 51 is designed as a so-called temple motor. The stator 100 comprises a plurality of coil cores 125, here eight coil cores 125, each of which comprises a longitudinal leg 126, which extends from a first end, in FIG. 1A and FIG. 1B the lower end according to the representation, in axial direction A to a second end, and a transverse leg 127, which is arranged at the second end of the longitudinal leg 126 and in the radial plane E. Each transverse leg 127 extends from the associated longitudinal leg 126 in radial direction towards the rotor 51 or the cup-shaped recess 121, respectively, and is limited by a radially inner end face. The coil cores 126 are arranged around the cup-shaped recess 121 with respect to the circumferential direction, so that the rotor 51 is arranged between the radially inner end faces of the transverse legs 127 of the coil cores 126.

All first ends of the longitudinal legs 126 are connected to each other by a back iron 122 for conducting the magnetic flux. At least one concentrated winding 160, 161 is provided at each longitudinal leg 126, which surrounds the respective longitudinal leg 126. With respect to the number and arrangement of the concentrated windings 160, 161, many variants are known, which are not explained in more detail here. For example, there are such windings 160 which are wound around exactly one longitudinal leg 126 and such windings 161 which are arranged around exactly two longitudinal legs 126.

The plurality of the longitudinal legs 126, which extend in axial direction A and are reminiscent of the columns of a temple has given the temple motor its name.

In the variant represented in FIG. 1B, the stator 100 has a centrally arranged opening 103, which extends from the second axial end 102 of the stator 100 in axial direction A into the cup-shaped recess 121. The centrally arranged opening 103 is designed in a cylindrical manner and pierces the bottom of the cup-shaped recess 121. Thus, the centrally arranged recess 121 extends in axial direction A through the entire stator 100 from the first axial end 101 to the second axial end 102. With respect to the radial direction, the centrally arranged opening 103 is delimited by an inner wall 104. Preferably, the inner wall 104 is designed as a hermetically sealed wall 104 so that the components arranged in the stator 100, such as the coil cores 125 with the concentrated windings 160, 161 arranged thereon, are hermetically sealed.

In the embodiment represented in FIG. 1A, the centrally arranged opening 103 is not present.

The pump unit 50 comprises a pump housing 52 with an inlet 523 and with an outlet 524 for the fluid, as well as the rotor 51 for conveying the fluid arranged in the pump housing 52, which rotor can be rotated about the axial direction A. The rotor 51 comprises a magnetically effective core 511, which interacts magnetically with the stator 100 to form the torque and to generate the magnetic levitating forces. For example, the magnetically effective core 511 is a permanent magnetic ring or a permanent magnetic disk.

The pump housing 52 is preferably made of a synthetic material, for example polypropylene (PP), polyethylene (PE), polytetrafluoroethylene (PTFE) or a perfluoroalkoxy polymer. Of course, embodiments are also possible in which the pump housing 52 is made of a metallic material, for example of a stainless steel.

In particular, the pump unit 50 can also be designed for single use, i.e. as a single-use part. The term "single-use part" and other compositions with the component "single-use", such as single-use component, single-use device etc., refer to those devices, components or parts which are designed for single-use, i.e., which can be used only once as intended and are then disposed of. For a new application, a new, previously unused single-use part must then be used. When configuring or designing the pump unit 50 as a single-use device, it is a substantial aspect that the pump unit can be assembled with the reusable stator 100 or be separated from the stator 100 as easily as possible. The pump unit 50 should therefore be able to be replaced very easily without the need for high assembly effort.

Such embodiments are also possible in which the magnetically effective core 511 is designed in a permanent magnetic-free manner, i.e., without permanent magnets. The rotor 51 is then designed as a reluctance rotor, for example. Then, the magnetically effective core 511 of the rotor 51 is made of a soft magnetic material, for example. Suitable soft magnetic materials for the magnetically effective core 511 are, for example, ferromagnetic or ferrimagnetic materials, i.e. in particular iron, nickel-iron, cobalt-iron, silicon-iron, mu-metal.

Furthermore, embodiments are possible in which the magnetically effective core 511 of the rotor 51 comprises both ferromagnetic materials and permanent magnetic materials. For example, permanent magnets can be placed or inserted into a ferromagnetic base body. Such embodiments are advantageous, for example, if one wishes to reduce the costs of large rotors by saving permanent magnetic material.

Typically, the magnetically effective core 511 is completely encased in a plastic material. In other embodiments, the magnetically effective core 511 is completely enclosed in a sheath consisting of a ceramic material or a metallic material, for example stainless steel or titanium or tantalum.

Furthermore, the rotor 51 comprises a plurality of vanes 513 for conveying the fluid from the inlet 523 to the outlet 524. The vanes 513 are arranged on the plastic sheath or on the sheath of the magnetically effective core 511. The vanes 513 are preferably made of plastic material and can, for example, be designed in one piece with the plastic sheath. Of course, it is also possible to manufacture the individual vanes 513 or the entirety of the vanes 513 in a separate manufacturing process and then connect them to the plastic sheath of the magnetically effective core 511, for example by means of a welding process.

The impeller formed by the rotor 51 with the vanes 513 is preferably designed as radial impeller, which is approached by the fluid from the inlet 523 in axial direction A, and then deflects the fluid in a radial direction.

The pump housing 52 comprises a bottom part 521 and a cover 522 for closing the bottom part 521. The bottom part 521 of the pump housing 52 has a cup 531 for receiving the rotor 51. The cup 531 is inserted into the cup-shaped recess 121 in the stator 100, so that the rotor 51, more precisely the magnetically effective core 511 of the rotor 51, is arranged between the transverse legs 127 of the coil cores 125.

For example, the pump unit 50 is attached to the stator housing 120 by means of a plurality of screws 111. In other embodiments, the pump unit 50 is fixed to the stator 100 by means of a bayonet connection. In particular in embodiments of the pump unit 50 as a single-use part, the bayonet connection enables a quick exchange of the pump unit 50. Usually, the bayonet connection is secured by a pin lock.

In particular, if the centrifugal pump 200 is designed for very high outputs, for example for an output of four kilowatts or more, very large or very strong magnets, for example permanent magnets, are used in the rotor 51 and/or in the stator 100. This results in enormous magnetic forces, so that changing the pump unit 50 becomes very difficult. There is a significant risk of injury to operating personnel or damage to the pump unit 50 or the stator 100 when replacing the pump unit 50.

If the rotor 51 is passively magnetically levitated in axial direction A, the passive magnetic forces typically also act when the stator 100 is current-free, i.e. when the windings 160, 161 of the stator 100 are not applied with current. These passive magnetic forces, which act between the rotor 51 and the stator 100, must be overcome in order to change the pump unit 50.

According to the disclosure, a device for changing the pump unit 50 of a centrifugal pump 200 is therefore proposed. This device is designated in its entirety by the reference sign 1.

Figure 3:
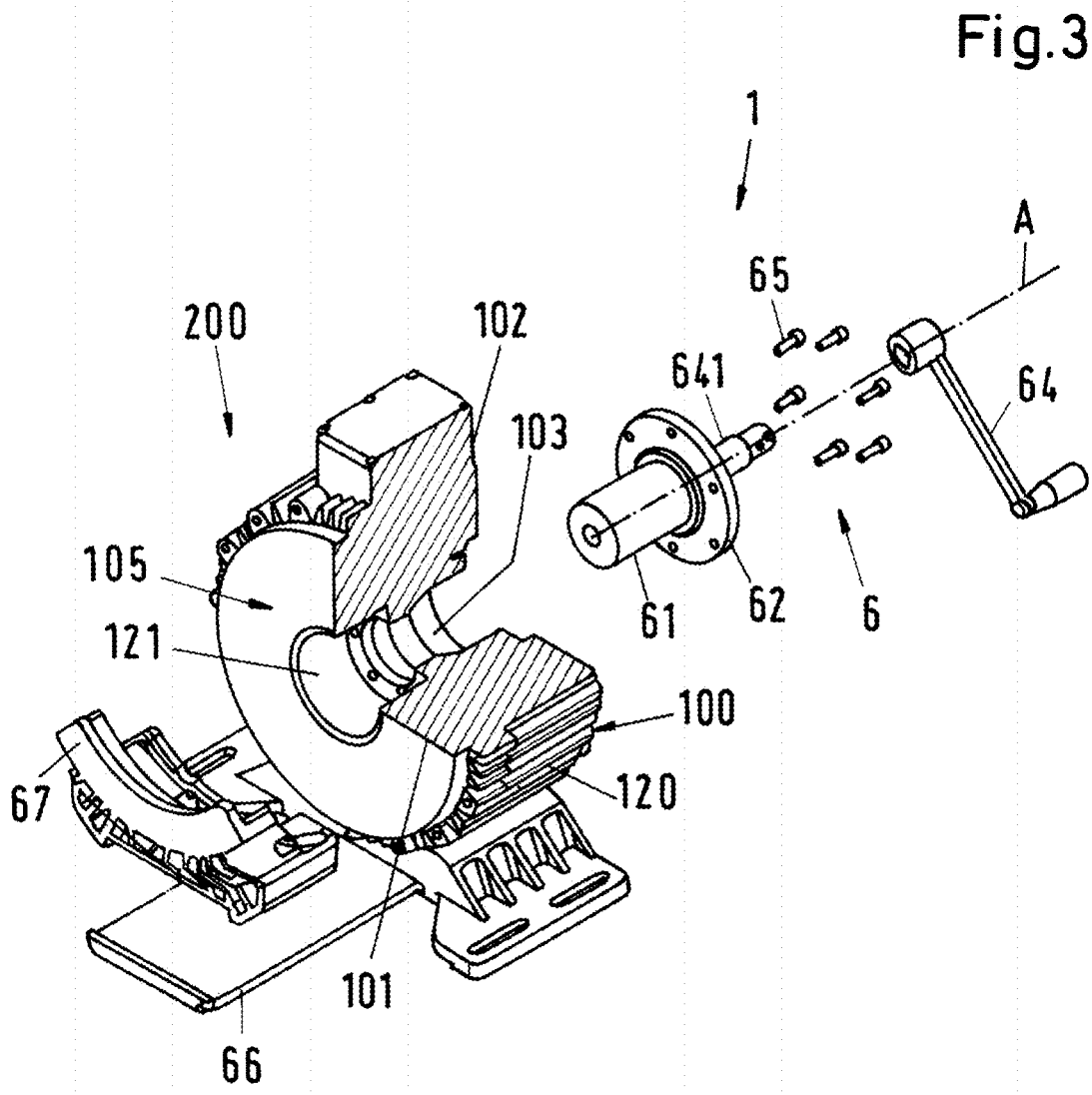
FIG. 3 is a perspective exploded view of a first embodiment of a device for changing the pump unit of a centrifugal pump, partially in section.
Figure 4:
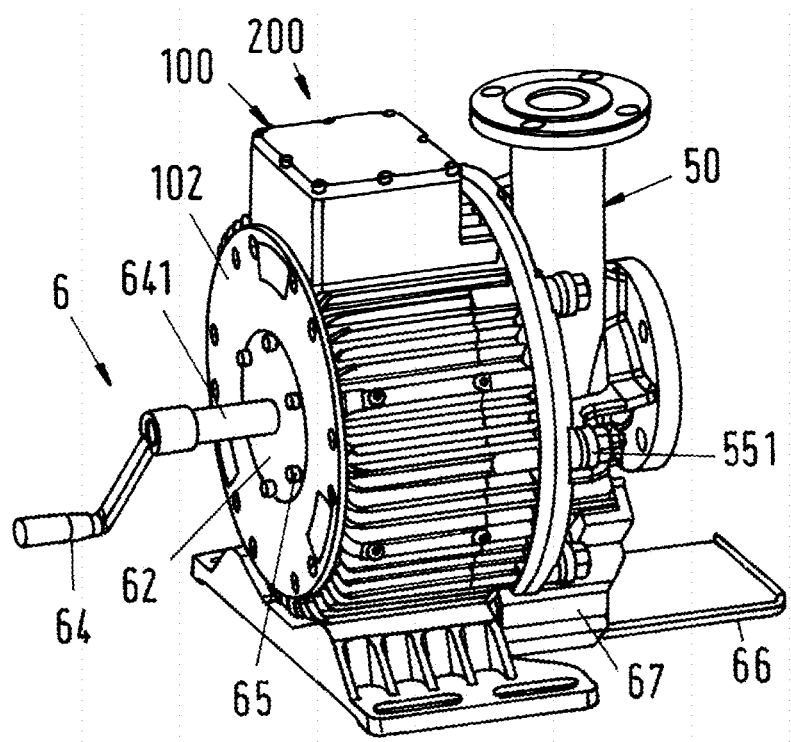
FIG. 4 is a perspective view of the first embodiment, fixed to a centrifugal pump.
Figure 5:
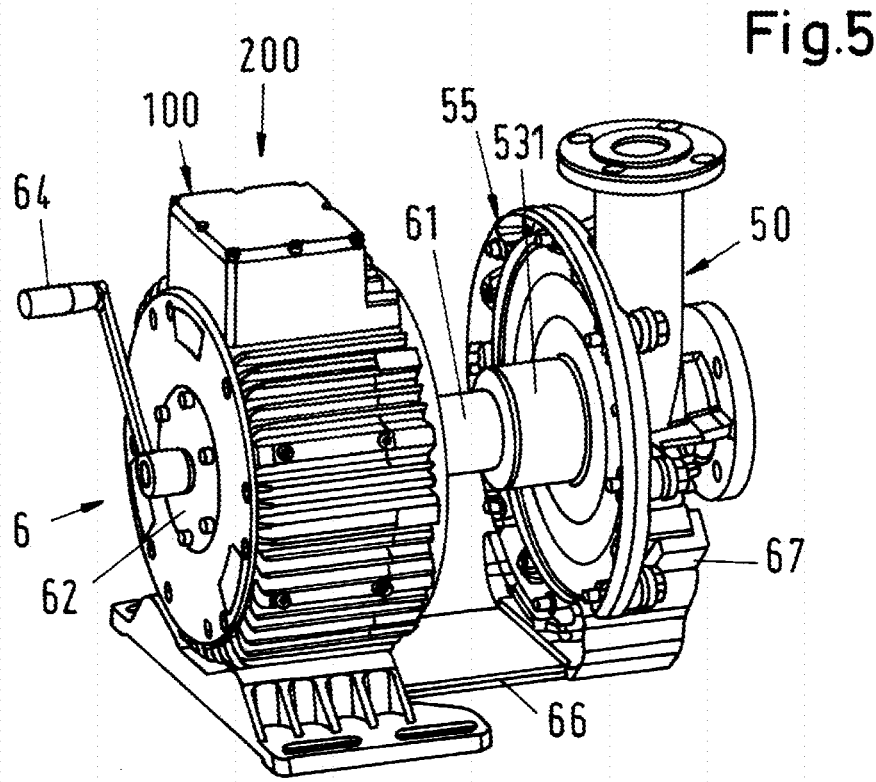
FIG. 5 is similar to FIG. 4, but when changing the pump unit.

FIG. 3 shows a perspective exploded view of a first embodiment of the device 1 for changing the pump unit 50 of a centrifugal pump 200. The representation in FIG. 3 is partially in section. FIG. 4 shows a perspective view of the first embodiment of the device 1, wherein the device 1 is fixed to the centrifugal pump 200. In a setting analogous to FIG. 4, FIG. 5 shows the device 1 when changing the pump unit 50.

The device 1 comprises an actuating device 6 with which a mechanical force can be exerted on the pump unit 50. This mechanical force acts in axial direction A and is directed such that it separates the pump unit 50 from the stator 100 in axial direction. The device 1 can be fixed to the stator 100.

In the first embodiment, the actuating device 6 comprises a piston 61, which is preferably designed in a cylindrical manner, a fixing plate 62 and a crank 64, which is designed as a threaded crank with a threaded rod 641. The piston 61 is connected to the threaded rod 641 in a torque-proof manner. For example, the piston 61 and the threaded rod 641 can also be designed in one piece. The fixing plate 62 is provided with an internal thread, which is designed to interact with the threaded rod 641. The piston 61 is arranged on one side of the fixing plate 62, and the threaded rod 641 projects on the other side of the fixing plate 62, so that the threaded rod 641 displaces the piston 61 in a linear manner relative to the fixing plate 62 by turning the crank 64.

As this can be recognized in particular in FIG. 3, the stator 100 has the centrally arranged opening 103, which extends from the second axial end 102 of the stator 100 in axial direction A into the cup-shaped recess 121. The centrally arranged opening 103 is designed in a cylindrical manner and is dimensioned such that the piston 61 can be inserted into the centrally arranged opening 103 and can be moved back and forth in axial direction A in the opening 103.

The piston 61 is inserted into the centrally arranged opening 103 from the second axial end 102 of the stator 200. Subsequently, the fixing plate 62 is attached to the second axial end 102 of the stator by means of a plurality of screws 65, so that the fixing plate 62 is fixed to the stator 100. By actuating the crank 64, the piston 61 can now be moved back and forth in axial direction A in the centrally arranged opening 103.

By displacing the piston 61 in the direction of the first axial end 101 of the stator 100, the mechanical force can now be generated which pushes the pump unit 50 out of the stator 100 (see FIG. 5).

In the centrifugal pump 200 represented in FIG. 4 and FIG. 5, the stator 100 comprises a containment can 105, in which the cup-shaped recess 121 is arranged, into which the pump unit 50 can be inserted. The containment can 105 forms the first axial end 101 of the stator 100. The containment can 105 is firmly connected to the stator housing 120, for example by means of a form-locking connection and/or by means of an elastic seal. Of course, the containment can 105 can also be attached to the stator housing 120 by means of screws.

The pump unit 50 comprises an attachment ring 55, which extends around the cup 531 of the pump housing 52 and is firmly connected to the pump housing 52. The attachment ring 55 serves to attach the pump unit 50 to the stator 100, for example by means of screws 551.

In the embodiment represented in FIG. 4 and FIG. 5, the pump unit 50 is pushed out of the stator 100 in axial direction A in order to change it, i.e. the mechanical force is exerted on the cup 531 so that this and thus the entire pump unit 50 is pushed out of the stator 100.

FIG. 4 shows the centrifugal pump 200 in a ready-to-operate state, in which the pump unit 50 is arranged in the cup-shaped recess 121 of the stator 100. It can be clearly recognized in FIG. 4 that the threaded rod 641 projects from the second axial end 102 of the stator 100. If the pump unit 50 is now to be separated from the stator 100, for example because the pump unit 50 is to be replaced by a new pump unit 50, the crank 64 is actuated so that the piston 61 in the centrally arranged opening 103 is displaced in direction of the first axial end 101 of the stator 100. Since the centrally arranged opening 103 extends into the cup-shaped recess 121, a passage is provided in the bottom of the cup-shaped recess 121 so that the piston 61 can move through the bottom of the cup-shaped recess 121 and then presses directly against the cup 531 of the pump housing 52 of the pump unit 50. As soon as the piston 61 rests against the cup 531 of the pump housing 52, the pump unit 50 is pushed out of the stator 100 when the crank 64 is actuated further. FIG. 5 shows the centrifugal pump 200 in an end position in which the pump unit 50 is completely pushed out of the stator 100. In this position, the pump unit 50 can be removed or exchanged very easily because-if at all-only very weak magnetic forces still act between the rotor 51 and the stator 100. In FIG. 5, it can also be recognized that the threaded rod 641 has now been moved significantly further into the stator 100.

Optionally, the device 1 for changing the pump unit 50 comprises a guide rail 66, which can be fixedly fixed to the stator 100 or is fixedly fixed to the stator 100, and which extends from the first end 101 of the stator 100 in axial direction A away from the stator 100. A supporting element 67 is arranged on this guide rail 66, which is supported on the guide rail 66 and which can be moved back and forth on the guide rail 66 in axial direction A. The supporting element 67 is designed in such a way that it supports the pump unit 50 when the pump unit 50 is pushed out of the stator 100. For example, the supporting element 67 can partially embrace the pump unit 50 so that the pump unit 50 is pushed out of the stator 100 exactly in axial direction A. In doing so, it can be efficiently prevented that the pump unit 50 is distorted or tilted by the strong magnetic forces, in particular when it is pushed out of the stator 100.

Of course, embodiments are also possible in which the movement of the piston 61 in the centrally arranged opening 103 takes place by a motor. For this purpose, a spindle motor can be provided instead of the crank 64, for example, which moves the piston 61 in the centrally arranged opening 103.

The device 1 can be permanently mounted on the centrifugal pump 200 or on the stator 100, for example also during the operation of the centrifugal pump 200.

Alternatively, it is also possible that the device 1 is fixed to the stator 100 only when required, i.e. to change the pump unit 50, and is removed from the stator 100 again after the pump unit 50 has been changed. Furthermore, it is possible that some components of the device 1 are permanently fixed to the stator 100, while other components of the device 1 are only fixed to the stator 100 for changing the pump unit.

Figure 6:
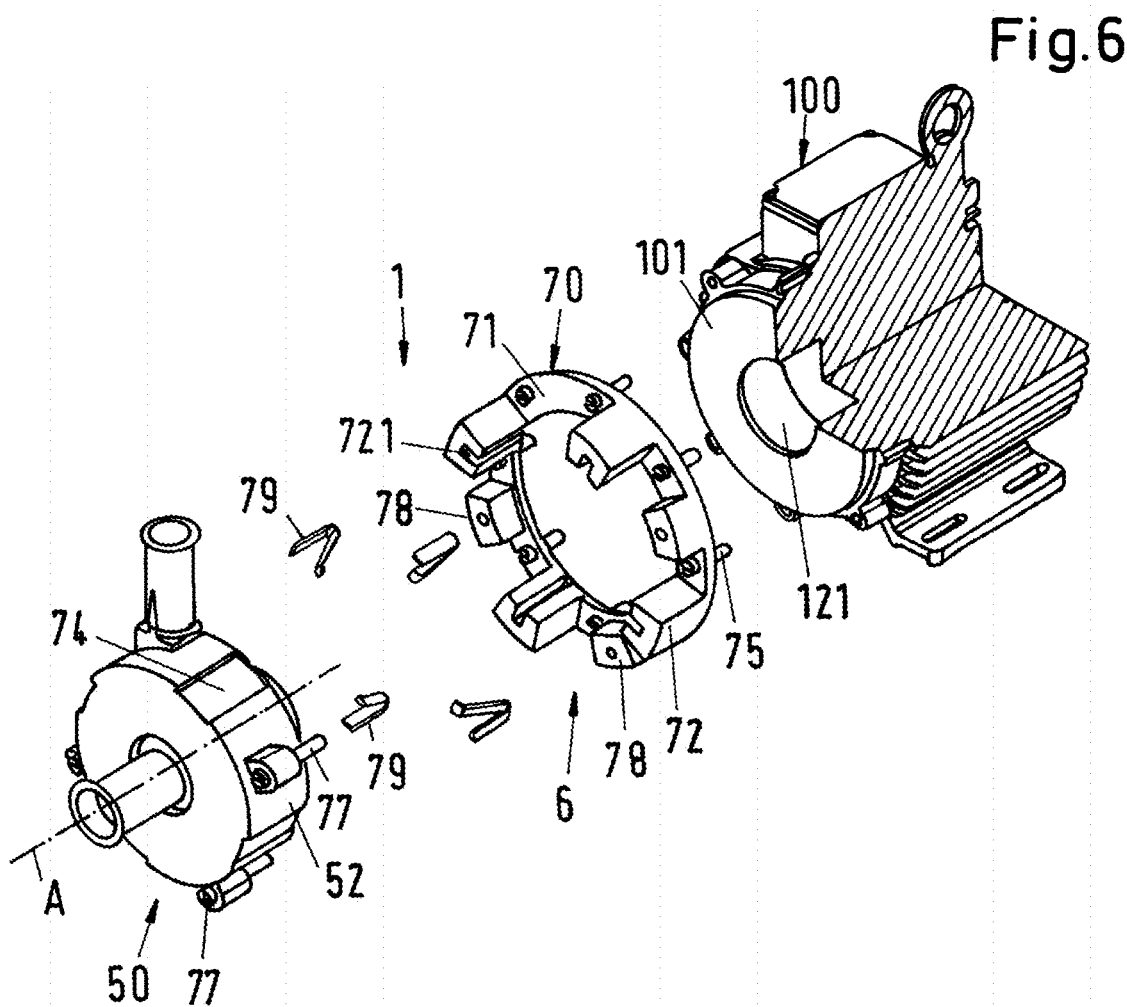
FIG. 6 is a perspective exploded view of a second embodiment of a device for changing the pump unit of a centrifugal pump, partially in section.

FIG. 6 shows a perspective exploded view of a second embodiment of a device 1 according to the disclosure for changing the pump unit 50, wherein the representation is partially in section. For better understanding, FIG. 7 also shows a perspective view of the second embodiment, fixed to a centrifugal pump 200.

In the following, only the differences from the first embodiment will be discussed. The same parts or parts equivalent in function of the second embodiment are designated with the same reference signs as in the first embodiment. In particular, the reference signs have the same meaning as already explained in connection with the first embodiment. It is understood that all previous explanations of the first embodiment also apply in the same way or in the analogously same way to the second embodiment.

In the second embodiment, the actuating device 6 is designed such that the mechanical force acts on an area of the pump housing 52 which is arranged outside the cup-shaped recess 121 of the stator 100. Since, in the second embodiment, the mechanical force does not act directly on the cup-shaped recess 121 or the cup 531 of the pump housing 52, the second embodiment also does not require the centrally arranged opening 103 in the stator 100.

In the second embodiment, the actuating device 6 comprises a mounting device 70, which can be fixed to the first axial end 101 of the stator 100, for example by means of a plurality of fixing screws 75. The mounting device 70 comprises a ring-shaped base 71, which is designed such that it can embrace the pump housing 52 and in particular the cup 531 of the pump housing 52. The ring-shaped base 71 is attached to the first axial end 101 of the stator 100 by means of the fixing screws 75, so that it is arranged around the cup-shaped recess 121. Then, the cup 531 of the pump housing 52 can be inserted into or removed from the cup-shaped recess 121 through the ring-shaped base 71.

Several, here four, guide elements 72 are provided on the ring-shaped base 71, each of which extends from the ring-shaped base 71 in axial direction A away from the stator 100. Each guide element 72 is here designed in a rod-shaped manner. The guide elements 72 are arranged such that the pump housing 52 of the pump unit 50 is guided in axial direction A between the guide elements 72. Optionally, a groove 74 extending in each case in axial direction A can be provided on the pump housing 52 for each guide element 72, in which groove the respective guide element 72 engages. In doing so, twisting of the pump housing 52 relative to the mounting device 70 can be effectively avoided.

Furthermore, several attachment elements 77 are provided at the pump housing 52, with which the pump housing 52 can be fixed to the mounting device 70. The attachment elements 77 are designed, for example, as fixation screws 77, which are arranged at the pump housing 52. For each fixing screw 77, an internally threaded piece 78 is provided in each case on the ring-shaped base 71, into which the respective fixation screw 77 engages. In this way, the pump unit 50 can be reliably attached to the mounting device 70.

Figure 7:
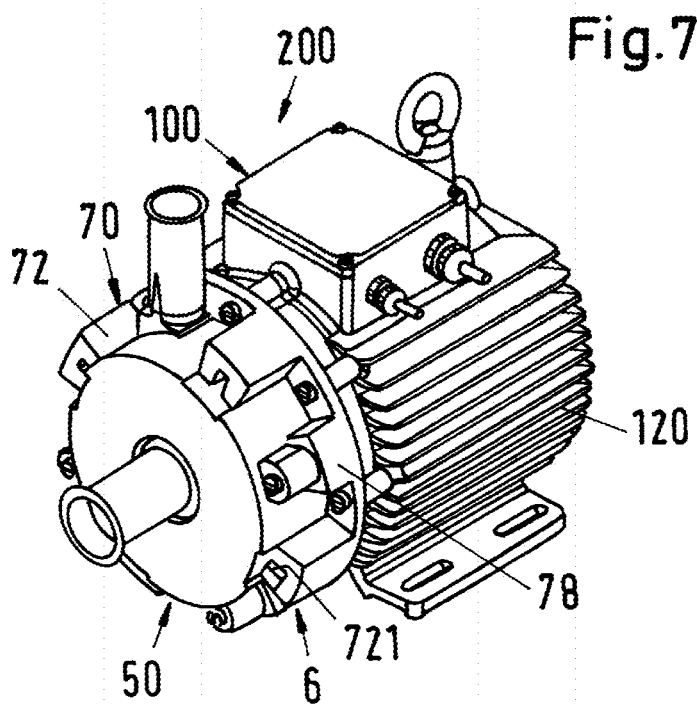
FIG. 7 is a perspective view of the second embodiment, fixed to a centrifugal pump.

The mounting device 70 comprises several elastic elements 79, which are arranged such that they are tensioned in axial direction A when the pump unit 50 is fixed in the stator 100. This means that when inserting the pump unit 50 into the cup-shaped recess 121 and tightening the fixation screws 77, the elastic elements 79 are tensioned. Thus, the pump unit 50 is inserted into the cup-shaped recess 121 against the elastic force of the elastic elements 79. FIG. 7 shows the inserted state of the pump unit.

If the pump unit 50 is now to be changed, the fixation screws 77 are loosened and the tensioned elastic elements 79 push the pump unit 50 out of the stator 100 in axial direction A with their elastic force.

FIG. 6 shows a possible design and arrangement of the elastic elements 79. Each of the guide elements 72 has an axial groove 721 on its radially inner side, which extends in axial direction A. A hinged spring is arranged in each axial groove 721 as elastic element 79. If the pump unit 50 is now inserted through the mounting device 70 into the cup-shaped recess 121 and attached with the fixation screws 77, the hinged springs are tensioned in the axial grooves 721.

If the fixation screws 77 are loosened to change the pump unit 50, the pump unit 50 is pushed out of the stator along the guide elements 72 by the spring force of the hinged springs acting in axial direction A.

Of course, many other variants of the specific embodiment are possible. It is a substantial aspect of the second embodiment that the insertion of the pump unit 50 into the stator 100 takes place against the force of elastic elements 79, preferably against the force of spring elements, so that these elastic elements 79 are tensioned in axial direction A when the pump unit 50 is fixed in the stator 100.

For example, axial springs can also be provided between the pump housing 52 and the mounting device 70.

Figure 8:
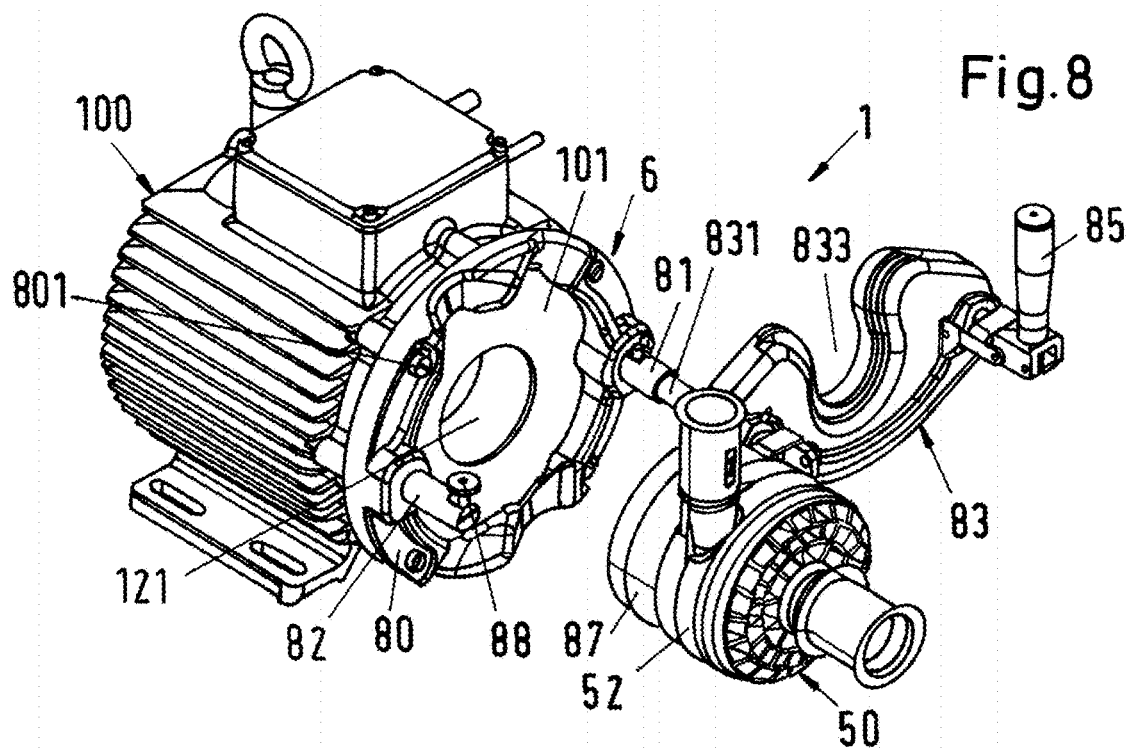
FIG. 8 is a perspective view of a third embodiment of a device for changing the pump unit of a centrifugal pump, the pump unit being separated from the stator.
Figure 9:
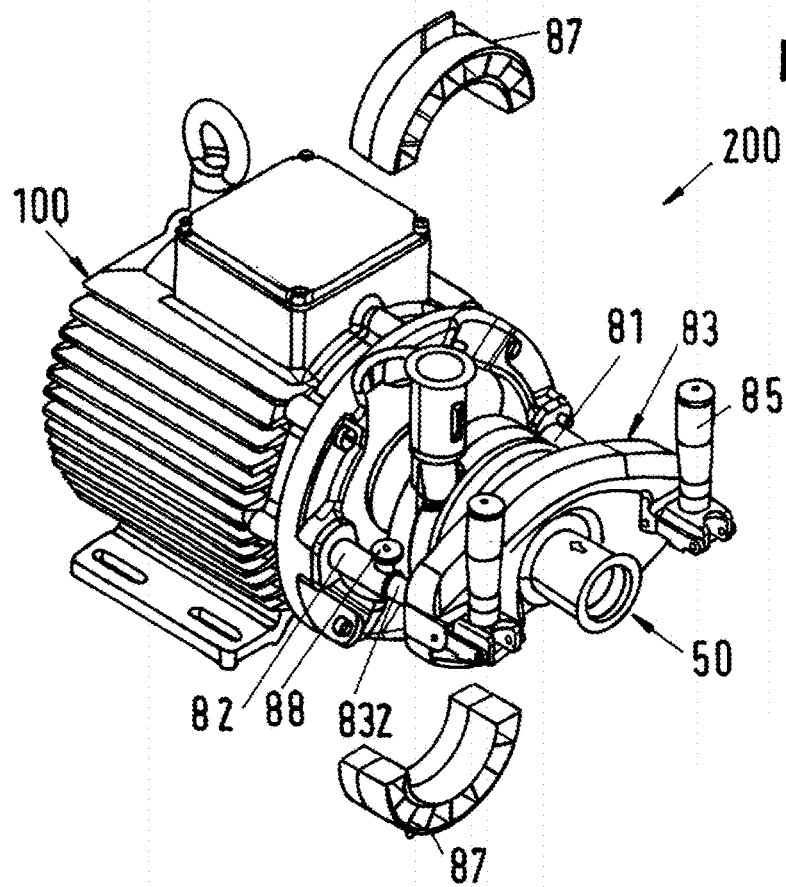
FIG. 9 is similar to FIG. 8, but after a first phase of inserting the pump unit into the stator.
Figure 10:
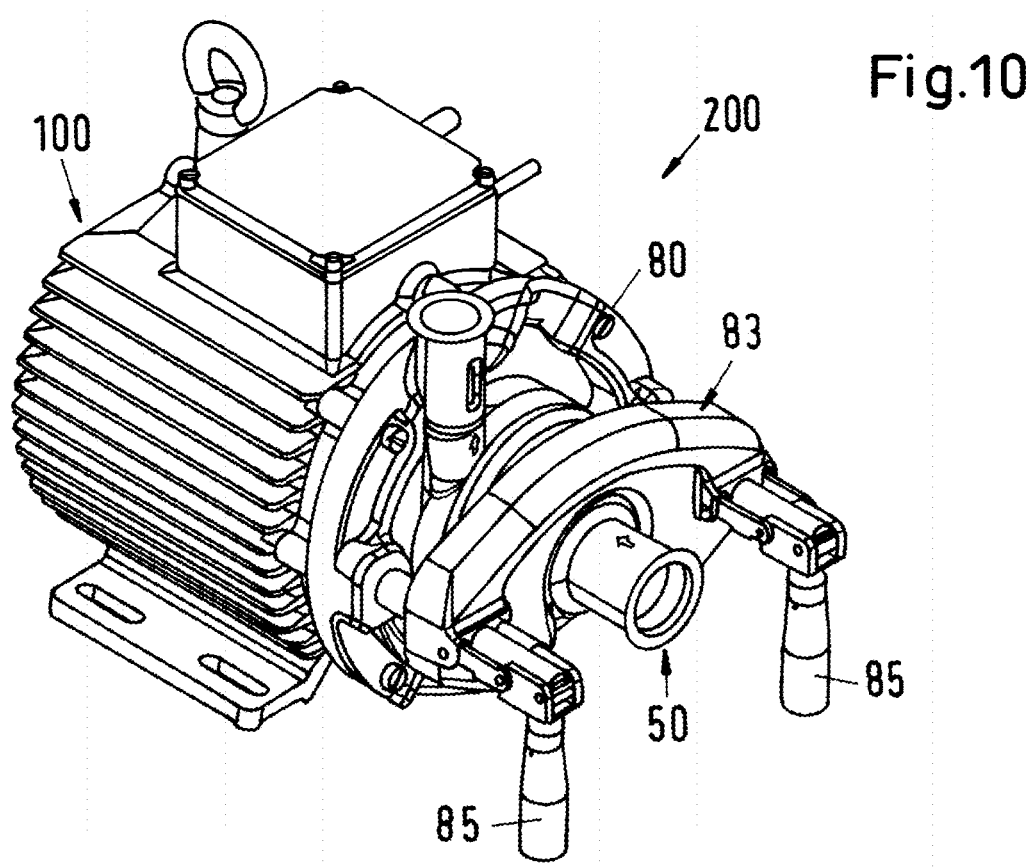
FIG. 10 is similar to FIG. 9, but after the pump unit has been inserted into the stator.

FIG. 8 shows a perspective view of a third embodiment of a device for changing the pump unit 50 of a centrifugal pump 200, wherein the pump unit 50 is separated from the stator. FIG. 9 shows the third embodiment after a first phase of insertion of the pump unit 50 into the stator 100. FIG. 10 shows the third embodiment after completion of the insertion of the pump unit 50 into the stator 100.

In the following, only the differences from the first and the second embodiment will be discussed. The same parts or parts equivalent in function of the third embodiment are designated with the same reference signs as in the first and second embodiment. In particular, the reference signs have the same meaning as already explained in connection with the first and the second embodiment. It is understood that all previous explanations of the first and second embodiment also apply in the same way or in the analogously same way to the third embodiment.

In the third embodiment, the removal of the pump unit 50 from the stator 100 and the insertion of the pump unit 50 into the stator 100 takes place by means of a leverage.

In FIG. 8, the pump unit 50 is represented separately from the stator 100. In the third embodiment, the actuating device 6 of the device 1 comprises a mounting ring 80 which can be fixed to the first axial end 101 of the stator 100, for example by means of a plurality of screws 801. The mounting ring 80 is designed such that it can embrace the pump housing 52 and, in particular, the cup 531 of the pump housing 52. The mounting ring 80 is attached to the first axial end 101 of the stator 100 by means of the screws 801, so that it is arranged around the cup-shaped recess 121. The cup 531 of the pump housing 52 can then be inserted into or removed from the cup-shaped recess 121 through the mounting ring 80.

A first guide rod 81 and a second guide rod 82 are arranged on the mounting ring 80, each extending from the mounting ring 80 in axial direction A away from the stator 100. Preferably, the two guide rods 81, 82 are arranged diametrically. A pivotable holding device 83 for holding the pump unit 50 is provided at the first guide rod 81. The holding device 83 can be pivoted about the first guide rod 81. For this purpose, the holding device 83 has, for example, a first guide pin 831, which engages in the first guide rod 81 and is rotatable in the first guide rod 81. Furthermore, the first guide pin 831 can be displaced in axial direction A in the first guide rod 81.

The holding device 83 further comprises a second guide pin 832 (FIG. 9), which is preferably arranged diametrically to the first guide pin 831. Furthermore, a tension lever 85 is provided in each case on the holding device 83 for each guide pin 831, 832, which can be moved back and forth between an open position (FIG. 9) and a closed position (FIG. 10).

FIG. 8 shows the holding device 83 in a first position. From this first position, the holding device 83 can be pivoted around the first guide rod 81 into a holding position, preferably by 180°. The holding position is shown in FIG. 9. In the holding position, the holding device 83 rests against the second guide rod 82. The second guide pin 832 is now aligned with the second guide rod 82, so that the second guide pin 832 can engage in the second guide rod 82 when the holding device 83 is displaced in axial direction A. This can be recognized in particular in FIG. 9.

The holding device 83 further has a holding opening 833, which is designed such that it can embrace the pump housing 52 of the pump unit 50. The holding opening 833 is open on one side so that the holding device 83 can be pivoted over the pump unit 5 so that the pump housing 52 is arranged in the holding opening 833 of the holding device 83. The pump housing 52 and the holding opening 833 are designed such that the pump housing 52 can no longer be displaced relative to the holding device 83 in axial direction A when the pump housing 52 is arranged in the holding opening 833.

Preferably, a removable protective jacket 87 is provided at the pump housing 52, which surrounds the cup 531 of the pump housing 52 in a ring-shaped manner. The protective jacket 87 has an outer diameter that is larger than the inner diameter of the cup-shaped recess 121, so that the pump unit 50 cannot be unintentionally pulled into the cup-shaped recess 121. The protective jacket 87 is preferably designed in two parts, for example with two half-shells (FIG. 9), so that the protective jacket 87 can be easily removed from the cup 531 of the pump housing 52.

The protective cup 87 not only prevents that the strong magnetic forces forcibly pull the pump unit 52 into the stator 100, whereby the pump unit 50 could be damaged by being forcefully pushed into the stator 100, but the protective cup 87 prevents that the cup 531 is protected against the attraction of ferromagnetic objects, in particular also in the case of rotors 51 which are designed in a permanent magnetic manner.

It is understood that the protective cup 87 can also be provided in other embodiments of the device 1 according to the disclosure.

In the following, the insertion of the pump unit 50 into the stator 100 is described with reference to FIG. 8 to FIG. 10. First, the holding device 83 is brought into the first position shown in FIG. 8. The pump unit 50 with the protective cup 87 is arranged in the mounting ring 80 and rests on the first end 101 of the stator 100.

Now the holding device 83 is brought into the holding position shown in FIG. 10, i.e. the holding device 83 is pivoted around the first guide rod 81 and over the pump unit 50, so that the pump unit 50 is held in the holding opening 833 of the holding device 83. Now the protective cup 87 is removed. By actuating the tension levers 85, namely by tilting the tension levers 85 downwards by 180° (according to the representation in FIG. 9), the pump unit 50 is pushed in axial direction A into the cup-shaped recess in the stator 100.

To separate the pump unit 50 from the stator 100, the tension levers 85 are moved from the closed position (FIG. 10) to the open position (FIG. 9), whereby the pump unit 50 is pulled out of the cup-shaped recess 121 in axial direction A. Subsequently, the holding device 83 is pivoted into the first position (FIG. 8) and the pump unit 50 can be removed.

Preferably, a locking element 88 is provided at the second guide rod 82, with which the holding device 83 can be fixed to the first guide rod 81 when the pump housing 52 is arranged in the cup-shaped recess 121. The locking element 88 is designed, for example, as a locking pin with a snap-in function, which engages in a hole in the second guide pin 832 when the pump housing 52 is arranged in the cup-shaped recess 121.

Figure 11:
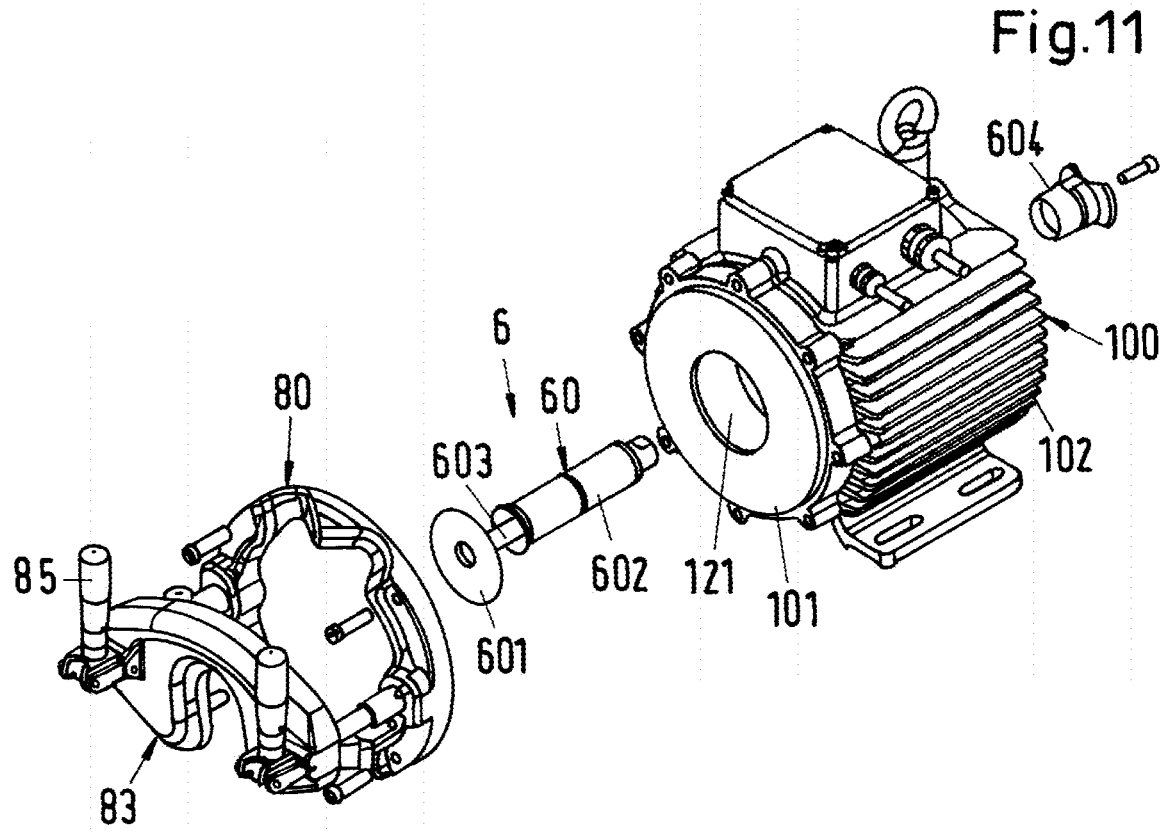
FIG. 11 is a perspective exploded view of a variant of the third embodiment.
Figure 12:
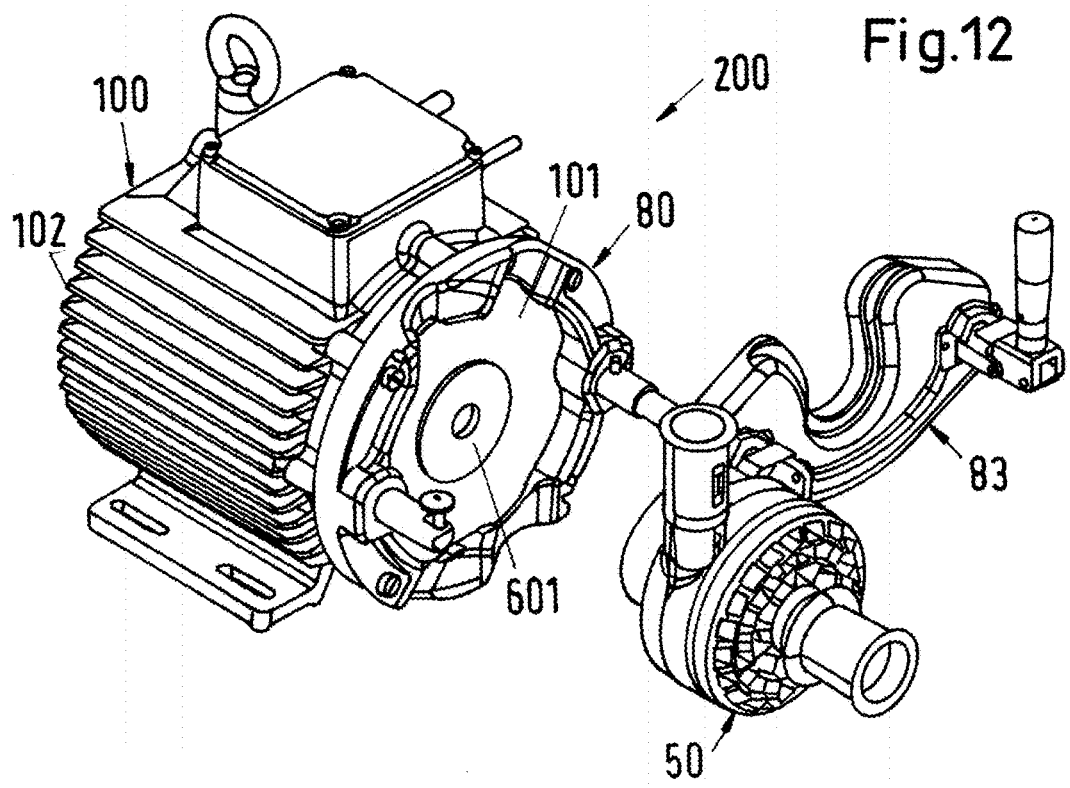
FIG. 12 is a perspective view of the variant from FIG. 11.

A variant for the third embodiment is represented in FIG. 11 and FIG. 12. FIG. 11 shows a perspective exploded view of the variant of the third embodiment and FIG. 12 shows a perspective view of the variant. The pump unit 50 is represented separately from the stator 100 in the analogously same way as in FIG. 8.

The variant described below is also possible in the analogously same way for other embodiments, for example for the second embodiment. The variant is described here as an example for the third embodiment.

In the variant represented in FIG. 11 and FIG. 12, the stator 100 has the centrally arranged opening 103, which extends from the second axial end 102 of the stator 100 in axial direction A to the cup-shaped recess 121, in a similar manner to that described in connection with FIG. 3. The centrally arranged opening 103 is designed in a cylindrical manner. In this variant, the actuating device 6 comprises a spring element 60, which is arranged in the centrally arranged opening 103. The spring element 60 is designed such that it is tensioned in axial direction A when inserting the pump unit 50 into the cup-shaped recess 121. Thus, the spring element 60 has a damping effect when inserting the pump unit 50. When separating the pump unit 50 from the stator 100, the spring element 60 facilitates the removal of the pump unit 50 from the cup-shaped recess 121 due to the spring force acting in axial direction A.

For example, the spring element 60 is designed as a gas spring. As can be recognized in particular in FIG. 11, the spring element 60 comprises a cylinder 602, in which a plunger 603 is arranged, which can be moved in axial direction A. A plate 601 is arranged at the end of the plunger 603, which is arranged outside the cylinder 602, which plate is located in the cup-shaped recess 121. The cup-shaped recess 121 is provided at its bottom with a passage through which the plunger 603 extends. When inserting the pump unit 50 into the cup-shaped recess 121, the plate 601 and the plunger 603 are displaced in the direction of the cylinder 602, whereby a gas volume is compressed in the cylinder 602 in a manner known per se. This compression results in the spring force, which is directed in axial direction A, in such a way that it tries to displace the plate 601 in the direction of the first axial end 101 of the stator 100.

A base element 604 is provided at the second axial end 102 of the stator 100, which is fixed to the stator 100 and which engages in the centrally arranged opening 103. The spring element 60 is supported on this fixed base element 604.

Figure 13:
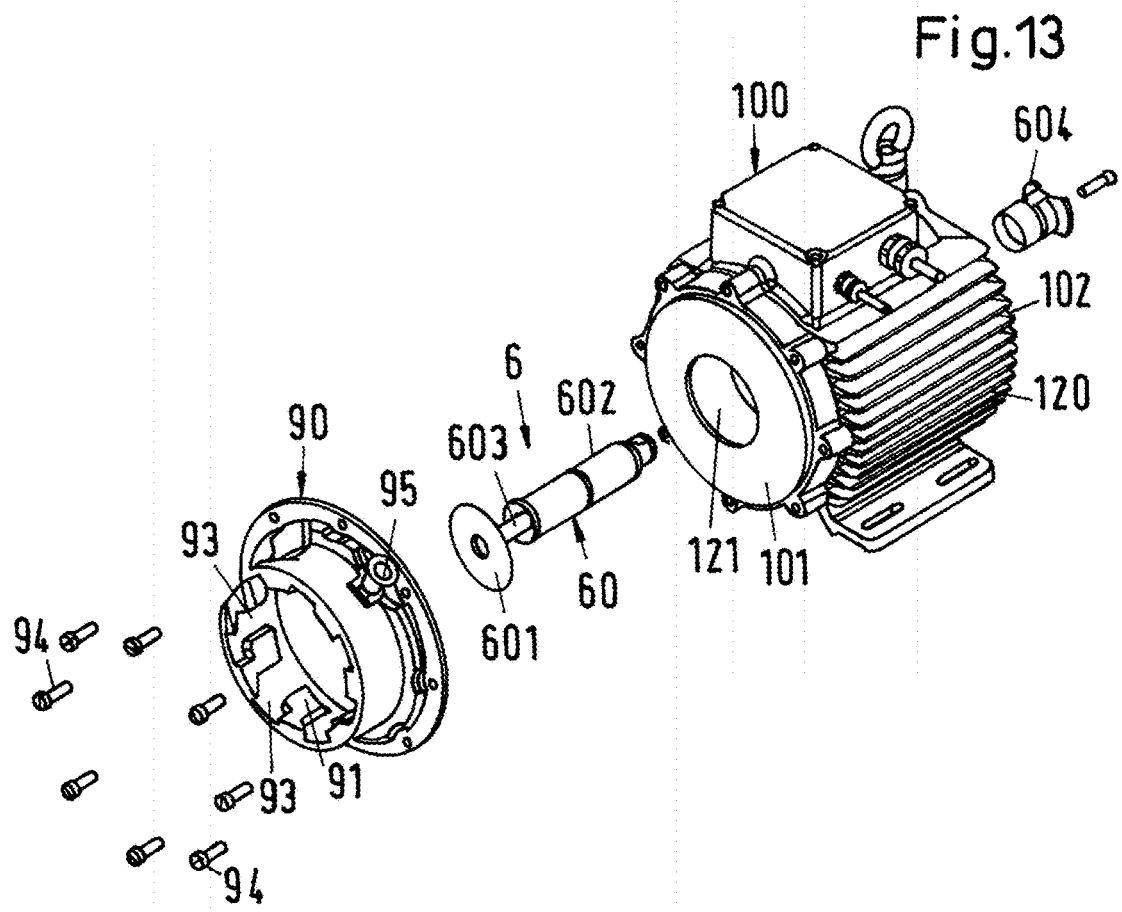
FIG. 13 is a perspective view of a fourth embodiment of a device for changing the pump unit of a centrifugal pump.

In the following, a fourth embodiment of a device 1 for changing the pump unit 50 is explained with reference to FIG. 13 to FIG. 17. FIG. 13 shows a perspective view of the fourth embodiment of the device 1. The pump unit 50 is not represented in FIG. 13. In a perspective view, FIG. 14 to FIG. 17 each show the fourth embodiment in various phases of inserting the pump unit 50 into the stator 100.

In the following, only the differences from the first, the second and the third embodiment will be discussed. The same parts or parts equivalent in function of the fourth embodiment are designated with the same reference signs as in the previously described embodiments. In particular, the reference signs have the same meaning as already explained in connection with the first, the second and the third embodiment. It is understood that all previous explanations of the first, second and third embodiment also apply in the same way or in the analogously same way to the fourth embodiment.

In the fourth embodiment of the device 1 according to the disclosure, the pump unit 50 is fixed in the stator 100 via a bayonet connection. For this purpose, the device 1 comprises a bayonet ring 90, which can be fixed to the first axial end 101 of the stator 100 such that the bayonet ring 90 is arranged around the cup-shaped recess 121. The bayonet ring 90 is designed for a bayonet connection to the pump housing 52 of the pump unit 50. For this purpose, the bayonet ring 90 comprises a plurality of claws 91 which are designed to interact with projections 92 (FIG. 14), wherein the projections 92 are arranged at the outside of the pump housing 52. Furthermore, a plurality of receiving grooves 93 are provided in the radially inner surface of the bayonet ring 90, by means of which the bayonet connection between the pump housing 50 and the bayonet ring 90 can be created and released.

The bayonet ring 90 is attached to the first axial end 101 of the stator by means of a plurality of fixing screws 94, so that the bayonet ring 90 is firmly connected to the stator 100.

Particularly preferably, the bayonet ring 90 is designed in such a way that the pump housing can be fixed in the bayonet ring 90 by a rotational movement relative to the bayonet ring 90 about the axial direction A, a subsequent movement in axial direction A and a subsequent rotational movement about the axial direction A. The two rotational movements take place in the same direction. For this purpose, the receiving grooves 93 in the bayonet ring 90 are designed accordingly. This can best be recognized in FIG. 13. After the pump housing has been inserted into the receiving grooves 93, the pump housing 52 must first be rotated relative to the bayonet ring 90 about the axial direction A before the pump housing 52 can be moved in the receiving grooves 93 in axial direction A towards the stator 100. After completing this linear movement, the pump housing 52 must be rotated again relative to the bayonet ring 90 about the axial direction A, so that the claws 91 of the bayonet ring 90 engage with the projections 92 at the pump housing 52, whereby the pump unit 50 is fixed in the bayonet ring 90. The release of the pump unit 50 takes place in the reverse order.

Preferably, a securing pin 95 is also provided at the bayonet ring 90, which engages in a recess in the pump housing 52 as soon as the pump housing 52 is fixed in the bayonet ring 90. The securing pin 95 has a snap-in function known per se, i.e. it engages automatically in the recess in the pump housing 52 as soon as the pump housing 52 is in the position in which the pump housing is fixed in the bayonet ring 90. To separate the pump unit 50 from the stator again, the securing pin 95 must first be pulled out of the recess in the pump housing 50 by hand before the bayonet connection can be released. Thus, the securing pin 95 prevents an unintentional separation of the pump unit 50 from the stator 100.

Figure 14:
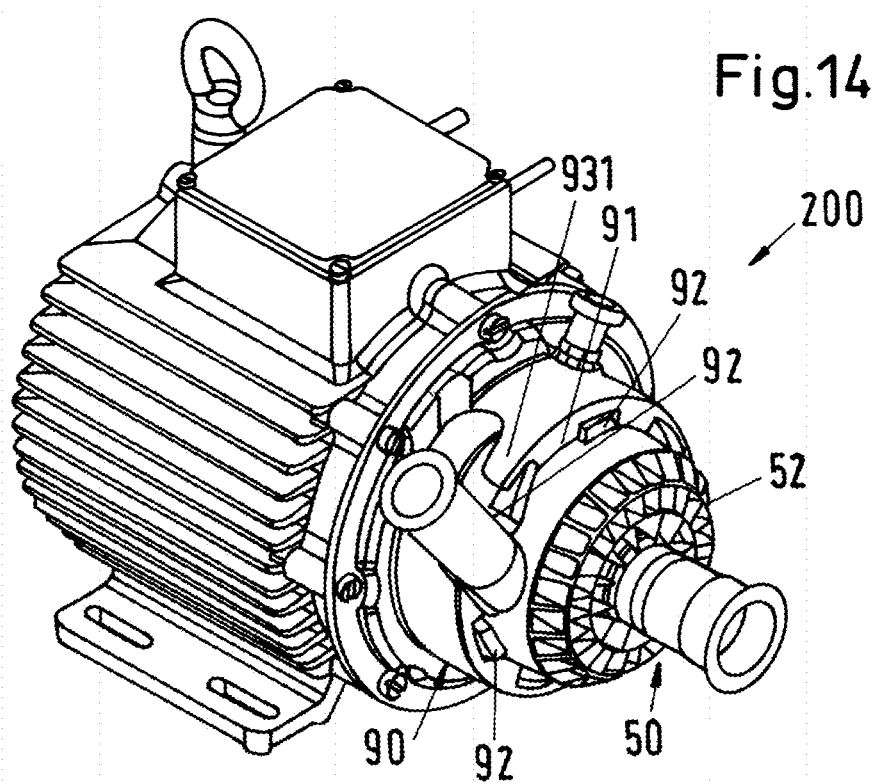
FIG. 14-17 are in each case a perspective view of the fourth embodiment in various phases of inserting the pump unit.
Figure 15:
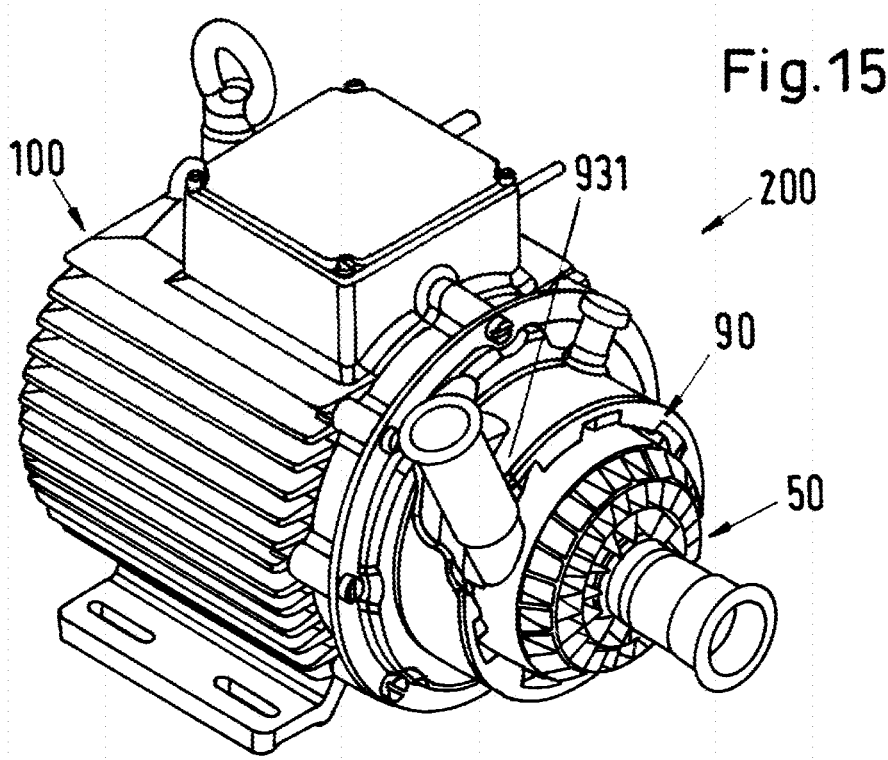
Figure 16:
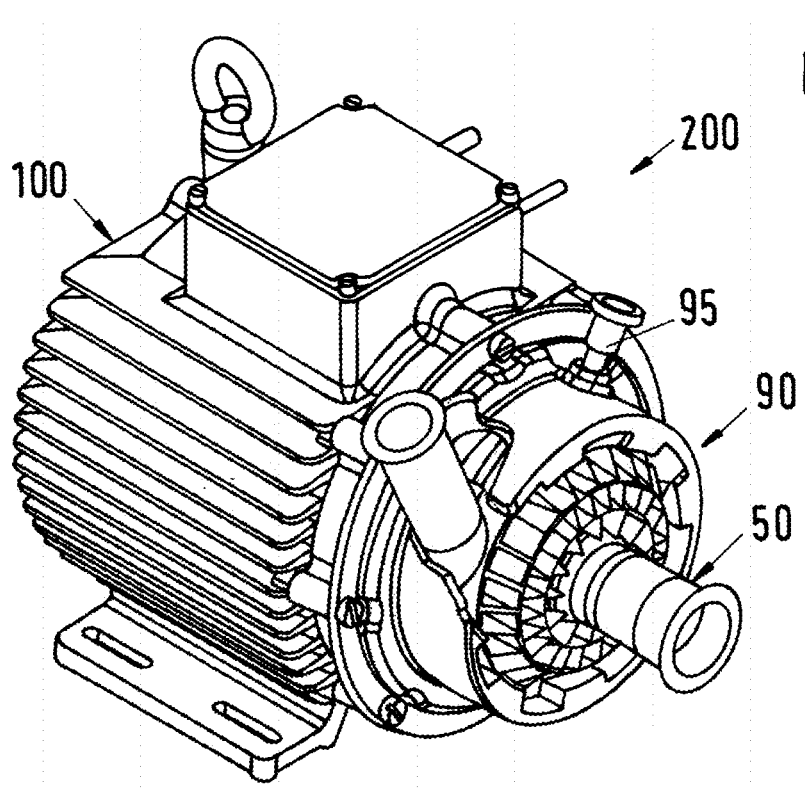
Figure 17:
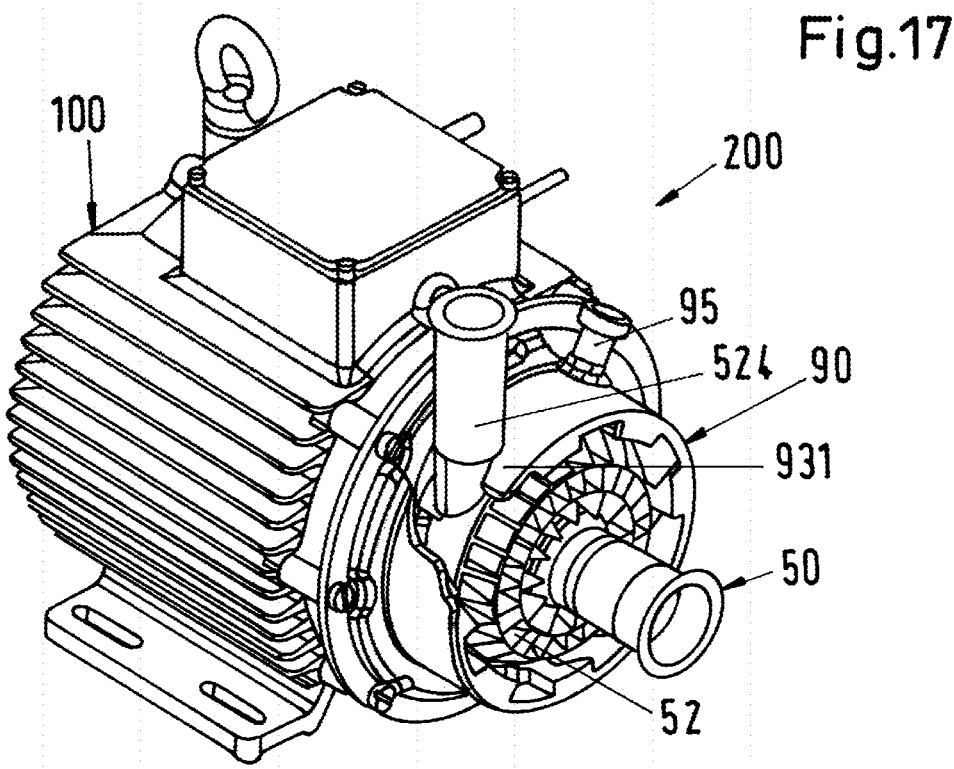

The creation of the bayonet connection between the pump unit 50 and the stator 100 is explained with reference to FIG. 14 to FIG. 17. First, the pump unit is inserted into the bayonet ring 90 in axial direction A, so that the position represented in FIG. 14 is achieved. Now the pump unit 50 is rotated about the axial direction A, clockwise according to the representation in FIG. 14 and FIG. 15, until the pump housing 50 rests against a nose 931, which delimits the receiving groove 93. This state is shown in FIG. 15. Subsequently, the pump unit 50 is moved in axial direction A towards the first axial end 101 of the stator 100. After this movement in axial direction A, the pump unit 50 is in the position represented in FIG. 16. Then, the pump unit 50 is rotated about the axial direction A, clockwise according to the representation in FIG. 16 and FIG. 17. Due to this rotational movement, the claws 91 of the bayonet ring 90 are brought into engagement with the projections 92 at the pump housing 52, the nose 931 embraces the outlet 524 of the pump housing 52 and the securing pin 95 engages in the recess in the pump housing 52. This state is shown in FIG. 17. In this position, the pump unit 50 is fixed in the bayonet ring 90 and secured against unintentional release.

In the fourth embodiment, the actuating device 6 is designed in the analogous way as in the variant of the third embodiment, which was explained with reference to FIG. 11 and FIG. 12. Thus, the actuating device 6 comprises the spring element 60, which is arranged in the centrally arranged opening 103 of the stator 100.

The spring element 60 is designed such that it is tensioned in axial direction A when the pump unit 50 is inserted into the cup-shaped recess. Thus, the spring element 60 has a damping effect when the pump unit 50 is inserted. When separating the pump unit 50 from the stator 100, the spring element 60 causes (or at least facilitates) the removal of the pump unit 50 from the cup-shaped recess 121 by the spring force acting in axial direction A.

The spring element 60 is designed, for example, as a gas spring and comprises the cylinder 602, in which the plunger 603 is arranged, which can be moved in axial direction A. The plate 601, which is located in the cup-shaped recess 121, is arranged at the end of the plunger 603, which is arranged outside the cylinder 602. The cup-shaped recess 121 is provided at its bottom with a passage through which the plunger 603 extends. When inserting the pump unit into the cup-shaped recess 121, the plate 601 and the plunger 603 are displaced in the direction of the cylinder 602, whereby a gas volume is compressed in the cylinder 602 in a manner known per se. This compression results in the spring force, which is directed in axial direction A, in such a way that it displaces the plate 601 in the direction of the first axial end 101 of the stator 100. At the second axial end 102 of the stator 100, the base element 604 is provided, which is fixed to the stator 100 and which engages in the centrally arranged opening 103. The spring element 60 is supported on this fixed base element 604.

What is claimed is:

1. A device for changing a pump unit of a centrifugal pump, the pump unit and a stator extending in an axial direction from a first axial end to a second axial end, a cup-shaped recess is provided at the first axial end, into which the pump unit is capable of being inserted, the pump unit comprises a pump housing with a cup capable of being inserted into the cup-shaped recess of the stator, a rotor for conveying a fluid is arranged in the pump housing, the rotor having a magnetically effective core, the rotor is capable of being rotated about the axial direction, and the stator designed for a non-contact magnetic drive and a non-contact magnetic levitation of the rotor, the rotor is passively magnetically stabilized with respect to the stator at least in the axial direction, the device comprising:

an actuating device configured to exert a mechanical force on the pump unit, the mechanical force acting in the axial direction and being directed in such a way as to separate the pump unit from the stator in axial direction.

2. The device according to claim 1, wherein the actuating device is designed such that the mechanical force acts on the cup-shaped recess in the stator or on the cup of the pump housing.

3. The device according to claim 1, wherein the actuating device comprises a piston configured to be displaced in the axial direction, the piston configured to be inserted into a centrally arranged opening in the stator, and the displacement of the piston relative to the stator is configured to generate the mechanical force to separate the pump unit from the stator in axial direction.

4. The device according to claim 1, further comprising a guide rail configured to be fixed to the stator, and a supporting element displaceable in the axial direction is arranged on the guide rail, the supporting element protecting the pump unit against tilting when the pump is separated from the stator.

5. The device according to claim 1, wherein the actuating device is designed such that the mechanical force acts on an area of the pump housing which is arranged outside the cup-shaped recess of the stator.

6. The device according to claim 1, wherein the actuating device comprises a spring element configured to be inserted into a centrally arranged opening in the stator, the spring element is configured so as to be tensioned in the axial direction when the pump unit is inserted into the cup-shaped recess.

7. The device according to claim 1, further comprising a mounting device configured to be fixed to the first axial end of the stator, the mounting device having a ring-shaped base configured to embrace the pump housing, a plurality of guide elements are arranged on the base to guide the pump housing in axial direction into the cup-shaped recess of the stator, a plurality of attachment elements are provided to fix the pump housing, and the mounting device comprises a plurality of elastic elements (capable of being tensioned in the axial direction when the pump unit is fixed in the stator.

8. The device according to claim 1, further comprising a mounting ring configured to be fixed to the first axial end of the stator so as to be arranged around the cup-shaped recess, a first guide rod and a second guide rod are arranged on the mounting ring), each of the first and second guide rods extending in the axial direction, a pivotable holding device configured to hold the pump unit is provided at the first guide rod, the holding device configured to be pivoted into a holding position in which the holding device rests against the second guide rod, and at least one tensioning lever is provided, by actuation of the at least one tensioning lever, the holding device is displaced in the axial direction along the guide rods.

9. The device according to claim 8, further comprising a locking element at one of the first and second guide rods, the locking element configured to fix the holding device to the one of the first and second guide rods when the pump housing is arranged in the cup-shaped recess.

10. The device according to claim 1, further comprising a bayonet ring configured to be fixed to the first axial end of the stator so as to be arranged around the cup-shaped recess, and the bayonet ring is designed for a bayonet connection to the pump housing of the pump unit.

11. The device according to claim 10, wherein the bayonet ring is designed such that the pump housing is capable of being fixed in the bayonet ring by rotational movement relative to the bayonet ring about the axial direction, a subsequent movement in the axial direction and a subsequent rotational movement about the axial direction.

12. The device according to claim 10, further comprising a securing pin provided at the bayonet ring, the securing pin configured to fix the pump unit in the bayonet ring when the pump housing is arranged in the cup-shaped recess.

13. A centrifugal pump for conveying a fluid, comprising:
the pump unit; and
the stator extending in the axial direction from the first axial end to the second axial end, the cup-shaped recess is provided at the first axial end, into which the pump unit is configured to be inserted, the pump unit comprising the pump housing with the cup configured to be inserted into the cup-shaped recess of the stator, the rotor to convey the fluid is arranged in the pump housing, the rotor having the magnetically effective core, the rotor together with the stator forming the electromagnetic rotary drive, the stator designed for non-contact magnetic drive and non-contact magnetic levitation of the rotor, the rotor passively magnetically stabilized at least in the axial direction, the centrifugal pump configured to operate with the device for changing the pump unit according to claim 1.

14. The centrifugal pump according to claim 13, wherein the device for changing the pump unit is designed so as to be removable from the centrifugal pump in each case after the pump unit has been changed.

15. The centrifugal pump according to claim 13, wherein the electromagnetic rotary drive is designed as a temple motor, the stator has a plurality of coil cores, each of the plurality of coil cores comprising a longitudinal leg extending from a first end in the axial direction to a second end, and a transverse leg arranged at the second end of the longitudinal leg and extending in a radial direction which is perpendicular to the axial direction, the plurality of coil cores are arranged around the rotor with respect to a circumferential direction, so that the rotor is arranged between each transverse leg of the plurality coil cores, and at least one concentrated winding is provided at each longitudinal leg of the plurality coil cores, which winding surrounds a respective longitudinal leg.

* * * * *